(12) United States Patent
Peng

(10) Patent No.: US 6,774,939 B1
(45) Date of Patent: Aug. 10, 2004

(54) AUDIO-ATTACHED IMAGE RECORDING AND PLAYBACK DEVICE

(75) Inventor: Zhiyong Peng, Kawasaki (JP)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/514,956

(22) Filed: Feb. 29, 2000

(30) Foreign Application Priority Data

Mar. 5, 1999 (JP) ............................................ 11-058566

(51) Int. Cl.$^7$ .......................... H04N 5/76; H04N 5/222; H04N 5/91; G03B 17/24
(52) U.S. Cl. ............................... 348/231.4; 348/231.2; 348/333.02; 386/96; 396/312
(58) Field of Search .......................... 348/231.4, 231.2, 348/135, 333.02, 333.03; 396/312, 321; 340/988; 386/39, 45, 96, 106, 125, 126, 95

(56) References Cited

U.S. PATENT DOCUMENTS

| | | | |
|---|---|---|---|
| 4,574,306 A | * 3/1986 | van Raalte | 348/135 |
| 4,905,029 A | 2/1990 | Kelley | 354/76 |
| 5,276,472 A | 1/1994 | Bell | 354/76 |
| 5,521,663 A | 5/1996 | Norris, III | 354/106 |
| 5,644,557 A | * 7/1997 | Akamine et al. | 369/14 |
| 5,729,217 A | * 3/1998 | Ito et al. | 340/988 |
| 5,812,736 A | 9/1998 | Anderson | 386/96 |
| 5,862,229 A | 1/1999 | Shimizu | 381/17 |
| 5,966,122 A | * 10/1999 | Itoh | 345/838 |
| 6,026,346 A | * 2/2000 | Ohashi et al. | 701/210 |
| 6,128,037 A | * 10/2000 | Anderson | 348/231.4 |
| 6,199,032 B1 | * 3/2001 | Anderson | 703/21 |
| 6,334,025 B1 | * 12/2001 | Yamagami | 386/96 |
| 6,418,272 B1 | * 7/2002 | Higashiyama | 386/104 |
| 6,539,168 B2 | * 3/2003 | Ando et al. | 386/105 |
| 6,606,115 B1 | * 8/2003 | Alicandro et al. | 348/164 |

* cited by examiner

*Primary Examiner*—Wendy R. Garber
*Assistant Examiner*—Lin Ye
(74) *Attorney, Agent, or Firm*—Trueman H. Denny, II

(57) ABSTRACT

The inability to attach more than one audio file to a single image file is an example of a problem encountered in image recording devices that include an audio recording function whereby audio information can be recorded and played back along with previously captured image files. A major disadvantage of prior image capturing systems is that only one audio file could be attached to a single image file. The present invention discloses an audio-attached image recording and playback device that allows one or more audio files to be associated with a single image file using an audio file identifier for each audio file. The audio file identifier includes an audio file attachment position that has coordinate information about a specific portion of the image that is displayed on a monitor. The user defines the specific portion by using a cursor to select the specific portion. Audio information is recorded and is associated with that position on the image. During playback of the image file, the user can trigger playback of the audio file by using the cursor to select the audio file attachment position for that audio file. The audio file attachment position can be displayed on the monitor as a circle having a radius centered about the audio file attachment position. Additionally, the present invention allows one or more image files to be associate with an audio file. The audio file contains timing information so that the order in which the images were captured during the audio recording can be duplicated when the audio file is played back. For each image file, the audio file can include an image file identifier that includes image start and end time information.

22 Claims, 11 Drawing Sheets

$t_0$ : Start Time of Audio Recording
$t_j$ : Start Time of Image $IMG_j$.jpg Display
$t'_j$ : End Time of Image $IMG_j$.jpg Display 1: $D_{13} < D_{12}$ ; $D_{ik} = D_{13}$ ; $r_1 = D_{ik} \div 2 = D_{13} \div 2$ )

2: $D_{23} < D_{12}$ ; $D_{ik} = D_{23}$ ; $r_2 = D_{ik} \div 2 = D_{23} \div 2$ )

3: $D_{23} < D_{13}$ ; $D_{ik} = D_{23}$ ; $r_3 = D_{ik} \div 2 = D_{23} \div 2$ )

AUDIO-ATTACHED IMAGE RECORDING AND PLAYBACK DEVICE

BACKGROUND OF THE INVENTION

The present invention relates generally to a method and device for recording and playing back images having audio information associated with the images. More specifically, the present invention relates to a method and device for recording an image and associating one or more audio files with specific portions of the image so that during image playback an audio file associated with the specific portion of the image can be played back by selecting the specific portion on the image. Moreover, the present invention relates to a method and device for recording audio information and associating one or more image files with an audio file so that during playback of the audio file the image files can be played back in an ordered sequence.

Digital cameras capable of recording sound have come onto the market in recent years. For example, the KODAK™ DC260 and DC220 digital cameras allow a user to capture an image to produce an image file and to record audio content that can be attached to the image file. Information such as the recording date, the recording location, the photographers name, a description of the event, and other information can be recorded and stored as an audio file. However, with conventional digital cameras, only one audio file can be attached per image. Additionally, if one desires to append an audio recording to an existing audio file, the conventional digital camera will erase the existing audio file and replace it with the appended audio information. Essentially, the initial audio information is erased when further audio information is attached to the image.

Therefore, one disadvantage with prior art digital cameras is that only one audio file can be attached to a single image file. If a user wishes to record subsequent audio content to be appended to the audio file, the result is that the audio file is overwritten by the subsequently recorded content. Resulting are the following problems with image capture and audio recording.

First, take for example a case where it is desired to take a photograph of a group of people and to simultaneously record a message spoken by each person in the photograph. Using the prior art digital camera, for instance, the photograph is taken and the messages from the people in the photograph are recorded one after another. Because the image data and the audio information are recorded at the same time, problems can occur during the playback of the image and the audio information. For example, during playback you must listen to the messages of all the people in the photograph even though you only want to hear the message of a single person. Furthermore, during playback it can be difficult to determine who a message is coming from unless each person includes an introduction with his message.

Consequently, there is a need to play back audio information attached to image data with greater selectivity. For example, in the case where the listener is interested in hearing the message of a specific person in the photograph, the listener can select that person's image and hear the playback of that person's message. Similarly, if the listener desires only to hear the messages of three of the people in the photograph, then the listener needs only to select their respective images to hear the playback of their respective messages.

Second, in a case where a series of related subjects are photographed while audio information relating to each subject is being recorded, the prior art required the audio information for each subject be stored in an audio file that is attached to its related image file. Therefore, as each subject is photographed the audio information for that subject must be recorded and stored in a separate audio file. Accordingly, if the order in which the images are played back is changed, or if the data for a certain image is skipped, the audio information may not make sense when it is played back. Consequently, when the photographed images are played back, the audio information cannot be reproduced correctly unless the image data is played back in the correct order.

Accordingly, there is a need to synchronize the playback of the images so that the order of image playback is consistent with the content of the audio information. For example, if the images relate to a sophisticated piece of machinery and the audio information relates to how to fix the machinery, by synchronizing the order of image playback the audio information on how to fix the machine is played back in a manner consistent with the order in which the images were photographed.

SUMMARY OF THE INVENTION

The present invention solves the first problem by associating one or more audio files with an image file. The association between the audio files and the image file is accomplished by assigning an audio file attachment position to each audio file. The audio file attachment position includes coordinate information about a specific portion of the image. For example, a user can select one or more specific portions of the image using a cursor, and for each specific portion selected, the user can record audio information corresponding to that specific portion. Resulting is one audio file for each specific portion selected by the user and each audio file has an assigned audio file attachment position. The audio file name and audio file attachment position can be included in the image file.

During playback of the image file the user once again uses the cursor to select one of the previously selected specific portions. The audio file associated with that selection is then played back. For instance, after a group of people have been photographed, the cursor is moved to the position of one of the members of the group to select that member. The voice of that member is recorded to generate an audio file. The audio file attachment position is recorded in the image file. The selection and audio recording steps can be repeated for each member of the group. During playback, the image is displayed on the monitor and the user moves the cursor to the position of one of the members to select that member. The audio file for the selected member is then played back.

Other applications for playback of audio files associated with one or more positions on an image include retrieving an image from a data source such as the Internet or a wireless network, and displaying the image on a monitor. The monitor can be connected to a PC, a PDA, a laptop PC, or a palmtop PC, for example. For example, the image displayed on the monitor could include a model wearing articles to be sold. Selecting the shoes of the model using a cursor, for example, triggers playback of an audio file that contains audio information related to the shoes, such as the manufacturer's name, the size of the shoe, available shoe sizes, the model name for the shoe, and delivery dates for the shoe. Selecting a jacket worn by the model triggers playback of information about the jacket. A description of a pair of sunglasses worn by the model can be heard by selecting the sunglasses.

The present invention solves the second problem by associating a single audio file with one or more image files.

Timing information is assigned to each image file. The timing information includes an image playback start time and an image playback end time. Each image file is associated with the audio file using an image file identifier. The image file identifier includes the image file name and the timing information assigned to the image file. The file identifiers can be stored in the audio file.

One or more images are captured by a user as audio information about each image is being recorded to generate the audio file. An image file is generated for each captured image and each image file has an associated image file identifier. When the audio file is played back, the image files are played back in a sequence determined by their image playback start time and image playback end time. Therefore, if images one, two, and three are captured during the audio recording, then upon playback of the audio file, image one is played back first followed by image two and then image three.

As previously mentioned, the prior art allowed an association between a single image file and a single audio file. When several image files and their associated audio files are played back, the information in the audio file may not make sense unless the image files are played back in the order in which they were captured. The user may forget the order in which the images were recorded, or someone other than the user who took the images may have no knowledge of what order the images were recorded.

The present invention; however, allows the audio file to be played back independently of the image files. Furthermore, the sequence of image playback is determined by the timing information in the image file identifiers for each image file.

The advantages of the present invention include the ability to select one or more specific portions of an image and to record audio information that is related to each selection. Later, when the image is displayed, a user can select any one of the previously selected portions and the audio information related to that selection only is played back. Therefore, one image file can have one or more audio files associated with it. Because the audio information is stored in separate audio files it is possible to edit, delete, replace, or record over a previously recorded audio file. In the prior art, any attempt to modify the single audio file resulted in the audio file being erased. Therefore, the prior art does not allow discrete edits to the audio information contained in the audio file.

Another advantage is that several image files can be associated with one audio file along with image playback start and end times. When the audio is played back, each image is sequentially played back in the time order in which it was captured during audio recording.

Additionally, each image file can have a file name that is displayed on a monitor. A user can select any one of the image file names displayed on the monitor and only the portion of the audio information recorded during the capture of that image is played back.

Applications for the present invention include the presentation of high quality multimedia shows (slide shows) that are easy to conduct, presentation of art work, descriptions of complicated machinery, repair instructions, assembly instructions, and use as a sales tool.

For example, in real estate sales, the present invention can be used to display images of several properties. Information such as price, location, schools, interior and exterior details of each property can be explained by audio files associated with the displayed image.

In one embodiment of the present invention a device for image playback and audio recording includes a memory for storing and retrieving an image file and a monitor for displaying an image stored in the image file. A cursor selects at least one specific portion of the image and assigns an audio file attachment position to the specific portion. Audio information is recorded to generate an audio file that is assigned to the specific portion of the image. The audio file and the audio file attachment position are then stored in the memory.

In another embodiment, a device for image capturing and audio recording includes an image capturing means for capturing an image and a memory for storing the image in an image file. The image is displayed on a monitor and a cursor selects at least one specific portion of the image and assigns an audio file attachment position to the specific portion. Audio information is recorded to generate an audio file that is assigned to the specific portion of the image. The audio file and the audio file attachment position are then stored in the memory.

In one embodiment of the present invention the device includes audio playback means for audio playback of the audio information stored in the audio file. The image in the image file is displayed on the monitor and the cursor is used to select any one of the previously selected specific portions. The audio file associated with the selected specific portion is played back on the audio playback means.

In another embodiment, the image displayed on the monitor includes a circle for each previously selected specific portion. The circle has an effective radius that is centered about the audio file attachment position. The cursor is manipulated to select a position anywhere within the circle, and the audio file associated with the specific portion is played back on the audio playback means.

In one embodiment, a device for audio recording and image capturing includes audio recording means for generating an audio file, an image capturing means for generating an image file, and a memory for storing and retrieving the audio file. Audio information is recorded during image capture where one or more images are captured thereby generating one image file for each captured image. Each image file has an image playback start time and an image playback end time associated with the image file. The image files and their associated image playback start times and playback end times are stored in the memory.

In another embodiment, the device includes audio playback means and a monitor. The audio file is played back on the audio playback means and each image file is displayed in sequence on the monitor according to its associated image playback start time and playback end time.

Other aspects and advantages of the present invention will become apparent from the following detailed description, taken in conjunction with the accompanying drawings, illustrating by way of example the principles of the present invention.

DETAILED DESCRIPTION

Figure 1:
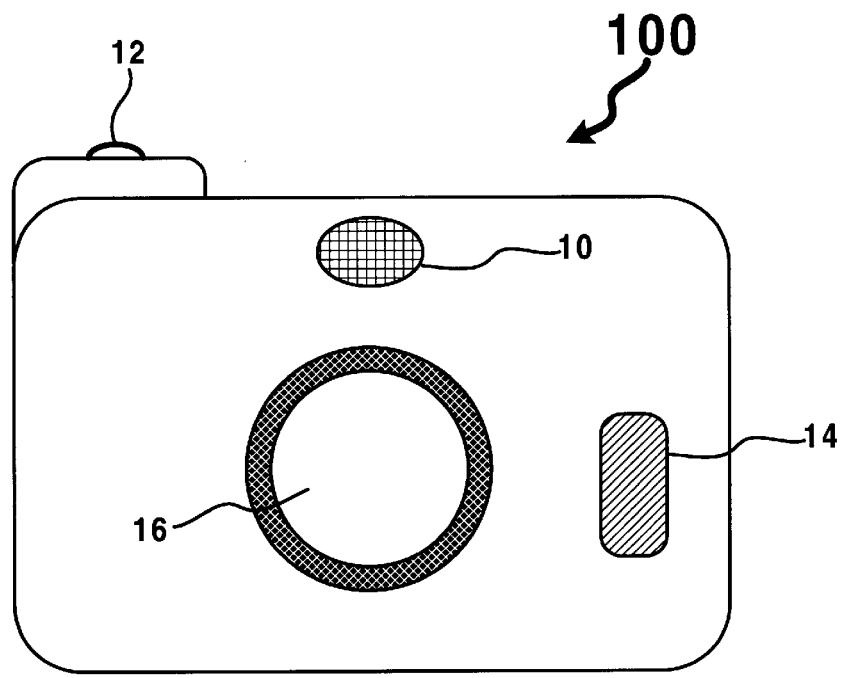
FIG. 1 is a front view of an audio-attached image recording and playback device according to the present invention.

In the following detailed description and in the several figures of the drawings, like elements are identified with like reference numerals.

As shown in the drawings for purpose of illustration, the present invention is embodied in a method and device for audio-attached image recording and playback. The device can include a monitor for displaying a captured image or for playing back a previously captured image, an image capture for generating an image file, an audio recorder for generating an audio file, an audio player for playing back a previously recorded audio file, and a memory for storing image files and audio files and for retrieving those files. Additionally the device can include a cursor control that allows a user of the device to select portions of a displayed image to which audio information will be attached during audio recording. The cursor control can also be used to select a portion of the displayed image that will trigger playback of audio information that is attached to the selected portion.

The method can include steps for providing an image to be displayed on a monitor and then selecting a specific portion of the displayed image to assign an audio file attachment position to the specific portion selected, whereby coordinate information about the position of the specific portion on the monitor is included in the audio file attachment position. An audio file is then generated by recording audio information that corresponds to the specific portion. The selecting and generating steps can be repeated to associate additional audio files with additional audio file attachment positions. Finally, all the audio file names and their associated audio file attachment positions can be stored in an image file.

Advantages of the present invention include the ability to associate one or more audio files with a single image file and to selectively play back the audio files by selecting a portion of the image that corresponds to the audio file attachment position for that audio file. Additionally, any previously recorded audio file can be edited by recording new audio information to replace the information in that audio file. This can be done without erasing other previously generated audio files.

Another advantage is that a single audio file can be associated with multiple image files. The audio file includes timing information that allows the image files to be played back in a sequence when the audio file is played back.

In FIG. 1, an audio-attached image recording and playback device 100 of the present invention includes a record microphone 10 used to record audio information such as speech or other sounds a user desires to record in connection with a subject whose image is being captured, a shutter button 12 for capturing an image in a manner similar to the shutter release button on a film camera, a lens 16 that is operative to focus an image on an image sensor (not shown), and a select button 14 that is used in conjunction with a cursor control 24 (not shown). The lens 16 can be a fixed focal length lens or it can be a variable focal length lens (a zoom lens), for example.

Figure 2:
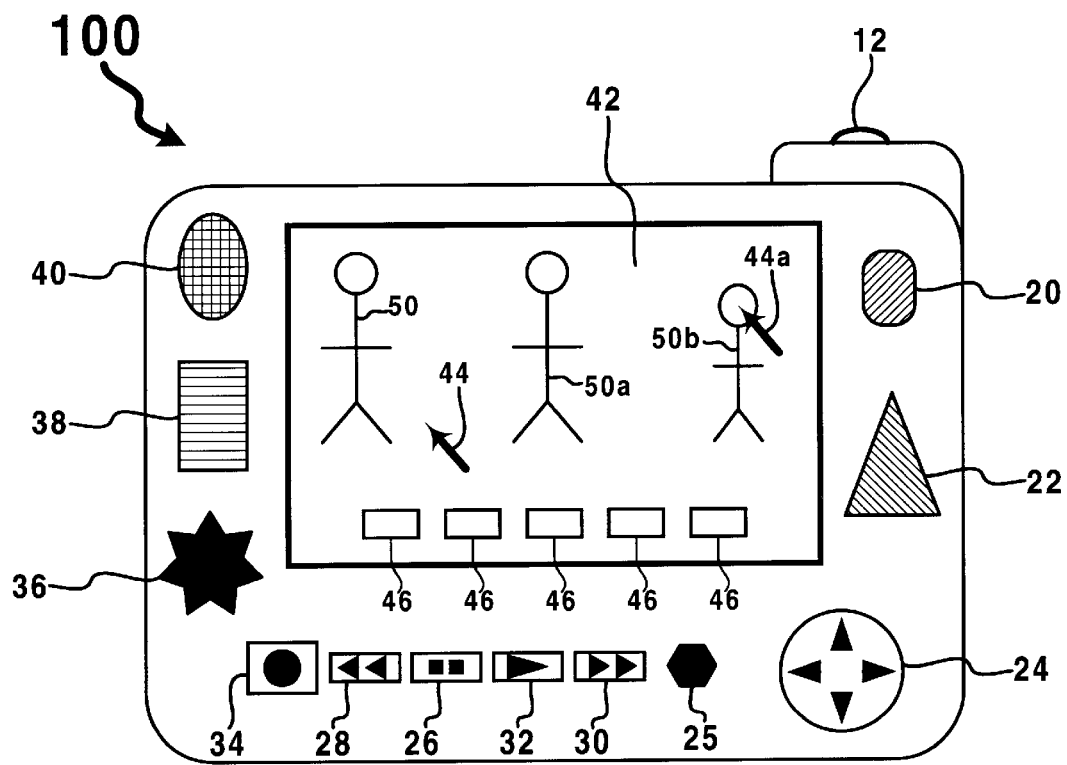
FIG. 2 is a rear view of an audio-attached image recording and playback device according to the present invention.

In FIG. 2, a rear view of the device 100 is shown. The device 100 includes a monitor 42 for displaying an image. FIG. 2 illustrates three images 50, 50a, and 50b being displayed on the monitor 42. The monitor 42 can be a liquid crystal display (LCD), for example. A user microphone 40 is operative to allow the user of the device 100 to record a message or a narrative about the images that are being captured or played back on the device 100.

Control buttons on the device 100 include, a rewind button 28 and a fast forward button 30 that are operative to rewind and fast forward, respectively, an audio file during playback of that audio file. The audio file can be played back over a speaker (an audio transducer) 38. Additionally, a play button 32 can be used to start playback of the audio file and a pause/resume button 26 can be used to temporarily stop and then resume playback of the audio file over the speaker 38. Playback of the audio can be halted using a stop button 25. To begin the recording of audio information using either one of the record microphone 10 or the user microphone 40, a record button 34 is pressed. These controls can be operated in a manner similar to those on a VCR, a Camcorder, or a CD player, for example.

Controls other than those listed above can be invoked by using a control button 36 in conjunction with a cursor control 24 to make a selection from control menu icons 46 displayed on the monitor 42. For example, the control menu icons 46 can be used to control the volume of the speaker 38 by using the cursor control 24 to select a "+" for volume up or a "−" volume down. Other features such as setting the time of day or the date can be effectuated using the control button 36 in conjunction with the cursor control 24, for example. Moreover, the control button 36 can be used to scroll thru various menu options and then the cursor control 24 can be used to highlight one of the menu selections and then the cursor control 24 can be pressed to select that highlighted option.

A display button 20 is operative to initiate display of an image on the monitor 42. As one or more images are being captured by the device 100, a timing button 22 is operative to select an image playback end time for the current image that is being captured. For instance, if a user desires to capture three images, the first image is captured while audio information about that image is being recorded. Each image is captured using the shutter button 12. When the shutter button 12 is pressed the image playback start time is set. Later, when the user has recorded sufficient audio information for the first image the timing button is again pressed to set the image playback end time. If the timing button is not pressed, the start time of the next image is regarded as the end time of the current image. This process is repeated for the second and third images. The recording of the audio information need not be interrupted as the user captures the second and third images because upon playback of the audio file, the image files associated with the audio file will be played back according to the order in which they were captured and will appear on the monitor 42 beginning at the image playback start time and will disappear from the monitor 42 at the image playback end time.

The device 100 is operative to display images on the monitor 42 and to capture images for playback on the monitor 42. As illustrated in FIG. 2, the monitor 42 has three images 50, 50a, and 50b displayed thereon. A cursor 44 is controlled by the cursor control 24. The cursor 44 can be moved about the monitor 42 by manipulating the cursor control 24 in a manner similar to a mouse, a trackball, or a joystick used for PC's and video games. The cursor 44 can be used to select any one of the images displayed on the monitor 42.

For instance, the cursor 44 can be positioned on the image 50b as shown by cursor 44a, to select a specific portion of that image. The specific portion has coordinates that can be used to associate an audio file with the image (as will be discussed below). Those same coordinates can be used during image playback to initiate audio playback of the audio file by moving the cursor 44 to the previously selected specific portion of the image and pressing the play button 32. If audio files are to be attached to the other images 50 and 50a, the cursor 44 can be moved to select a specific position on those images by using the cursor control 24.

Additionally, the cursor control 24 and the cursor 44 can be used to make selections from the control menu icons 46 by positioning the cursor 44 on one of the icons of the control menu icons 46, and then pressing the control button 36 to select the menu function associated with the icon. For instance, to activate the user microphone 40, the cursor 44 can be moved to select an icon that toggle the user microphone 40 from "off" to "on" or vice versa.

Figure 3:
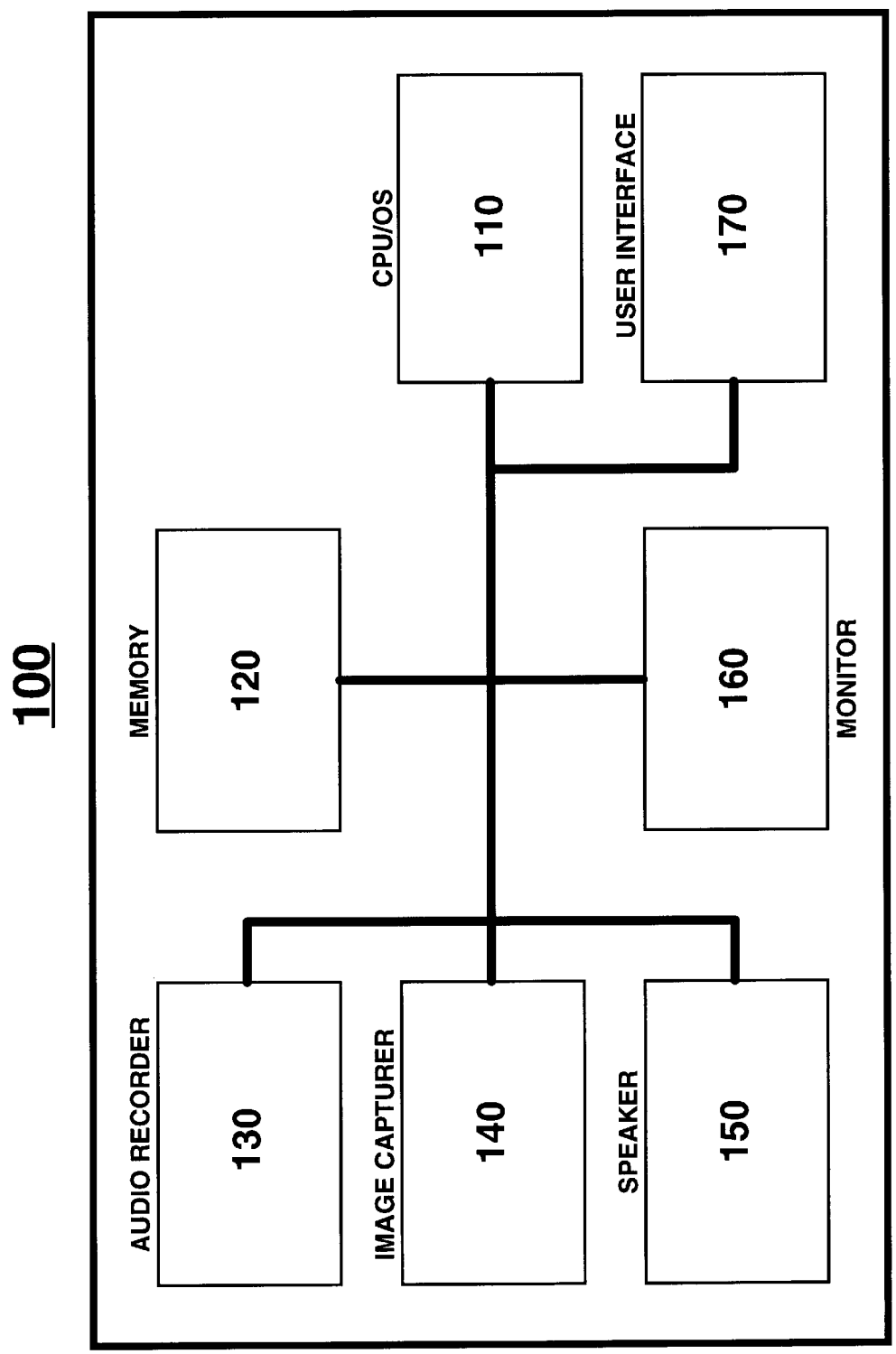
FIG. 3 is a block diagram of audio-attached image recording and playback device according to the present invention.

FIG. 3 is a block diagram of a preferred embodiment of the present invention. The device 100 includes an image capturer 140, an audio recorder 130, a speaker 150, a monitor 160, a memory 120, a user interface 170, and a central processing unit and operating system (CPU/OS) 110. The image capturer 140 includes the lens 16, the shutter button 12, and an image sensor such as a CCD or a CMOS active-pixel sensor (not shown), for example. The image capturer 140 captures an image focused onto the image sensor by the lens 16 to generate an image file (not shown) that is stored in the memory 120 via the CPU/OS 110. The audio recorder 130 is used to record sounds (audio information hereinafter) from either one of the record microphone 10 or the user microphone 40. An analog-to-digital converter (AD converter, not shown) is included in the audio recorder 130 to convert the analog audio information from the microphones (10 or 40) into digital data that is stored as an audio file in the memory 120. During playback of the audio file, a digital-to-analog converter (DA converter, not shown) included in the audio recorder 130 converts the digital data in the audio file into an analog output signal that is communicated to the speaker 150.

The memory 120 can be a form of random access memory (RAM) such as DRAM, SRAM, FRAM, or FLASH memory, for example. On the other hand, the memory 120 can be a hard disc or a floppy disc. Image data and audio data can be stored in the memory 120 in a data structure file format that will be discussed below. On the other hand, the image data and the audio data can be stored in the memory 120 as separate files. In order to conserve the amount of memory required to store image and audio data, the CPU/OS 110 can be used to compress the image data and the audio data before storing the data in the memory 120. Similarly, the CPU/OS 110 can be used to decompress the image data and the audio data when the data is retrieved from the memory 120.

A standard operating system (OS) for use in digital cameras can be used for the CPU/OS 110. Typically, a standard OS such as the DIGITA™ OS from FLASH-POINT™ TECHNOLOGY can be used for the CPU/OS 110 of the present invention. Hereinafter, the descriptions of the present invention will be premised on the use of the DIGITA™ OS; however, the present invention is not to be construed as being limited to a specific OS. Other OS including a custom designed OS can be used to implement the OS of the present invention.

The monitor 160 is operative to display a newly captured image or a previously captured image that is retrieved from the memory 120. The monitor 160 can be a flat-panel display, or CRT, for example. The user manipulates the cursor control 24 to select any portion of the image displayed on the monitor 160. Operation of the cursor control 24, the cursor 44, the displaying of the image on the monitor 160, the playback of audio, and so on are carried out through the user interface 170.

In one embodiment of the present invention, the device 100 includes the memory 120 for storing an image file 210 and for retrieving the image file 210. The image data stored in the image file 210 can be displayed as an image on the monitor 160 by retrieving the image file 210 from the memory 120. The cursor control 24 is operative to move the cursor 44 to select at least one specific portion of the image displayed on the monitor 160 and for assigning an audio file attachment position to that specific portion. The audio file attachment position includes coordinate information about the specific portion. For example, in a flat panel display, the position of the cursor 44 on the monitor can be associated with x-y coordinates that map to the rows and columns of pixels in the display. Accordingly, the audio file attachment position can be the x-y coordinates of the cursor when the specific portion is selected by the cursor control 24. For instance, if three specific portions of the image are selected by the cursor control 24, the audio file attachment positions for those three selections can have coordinates of: $(x_1, y_1)$; $(x_2, y_2)$; and $(x_3, y_3)$.

The audio recorder 130 is operative to record audio information from either of the microphones 10 or 40 and to generate an audio file 220. Recording can be initiated by pressing the record button 34, and recording can be stopped by pressing the stop button 25. The audio file attachment position associates the audio file 220 with the specific portion of the image. The name of audio file 220 and its attachment position is stored in the image file 210. More than one specific portion of the image can be selected using the cursor control 24. For each specific portion of the image selected there is a corresponding audio file attachment position that associates an audio file with the selected portion of the image. Therefore, the image file 210 can be associated with one or more audio files 220, each audio file having a corresponding audio file attachment position in the image file 210. The audio file 220 need not be stored in the image file 210. For instance, the audio file 220 can be stored as a discrete file in the memory 120.

In another embodiment of the present invention, the device 100 includes audio playback through the speaker 150. To play back the audio files that are associated with various portions of the image, the image file 210 is retrieved by the memory 120 and displayed on the monitor 160. The cursor control 24 is used to move the cursor 44 to one of the previously selected specific portions of the image and the audio file 220 associated with that specific portion of the image by its audio file attachment position is retrieved from the memory 120 and played back on the speaker 150.

In one embodiment of the present invention, the image displayed on the monitor 160 includes a circle for each specific portion selected by the cursor control 24. Each circle has an effective radius $r_i$ that is centered about its corresponding audio file attachment position. The cursor control 24 is manipulated to position the cursor anywhere within the circle and the audio file 220 associated with that audio file attachment position is retrieved from the memory 120 and played back on the speaker 150. Calculation of the effective radius $r_i$ will be discussed below.

In another embodiment of the present invention, the audio file 220 is associated with the image file 210 by an audio file identifier 214. The audio file identifier includes an audio file name for the audio file, the audio file attachment position, and the effective radius $r_i$. For example, if the audio file 220 is stored using the WAVE ".wav" format which is the audio file data format specified by MICROSOFT™, then the audio file identifier 214 can be of the form $(x_1, y_1, r_i, AU_1.wav)$, where $AU_1.wav$ is the audio file name.

The size of an audio file 220 according to the WAVE format is computed as follows:

Audio file size=(number of channels)*(sample rate)*(Bits per Sample)*(Compression Ratio)*Time For one channel, i.e. for one speaker 38, and 8 bits per sample at a sample rate of 11.025 kHz with 2:1 compression ratio, the audio file 220 containing one second of audio data would have a size of:

Audio file size=(1)*(11.025 kHz)*(8)*(0.5)*1 second÷8 Bits=5.5 KBytes

Figure 5:
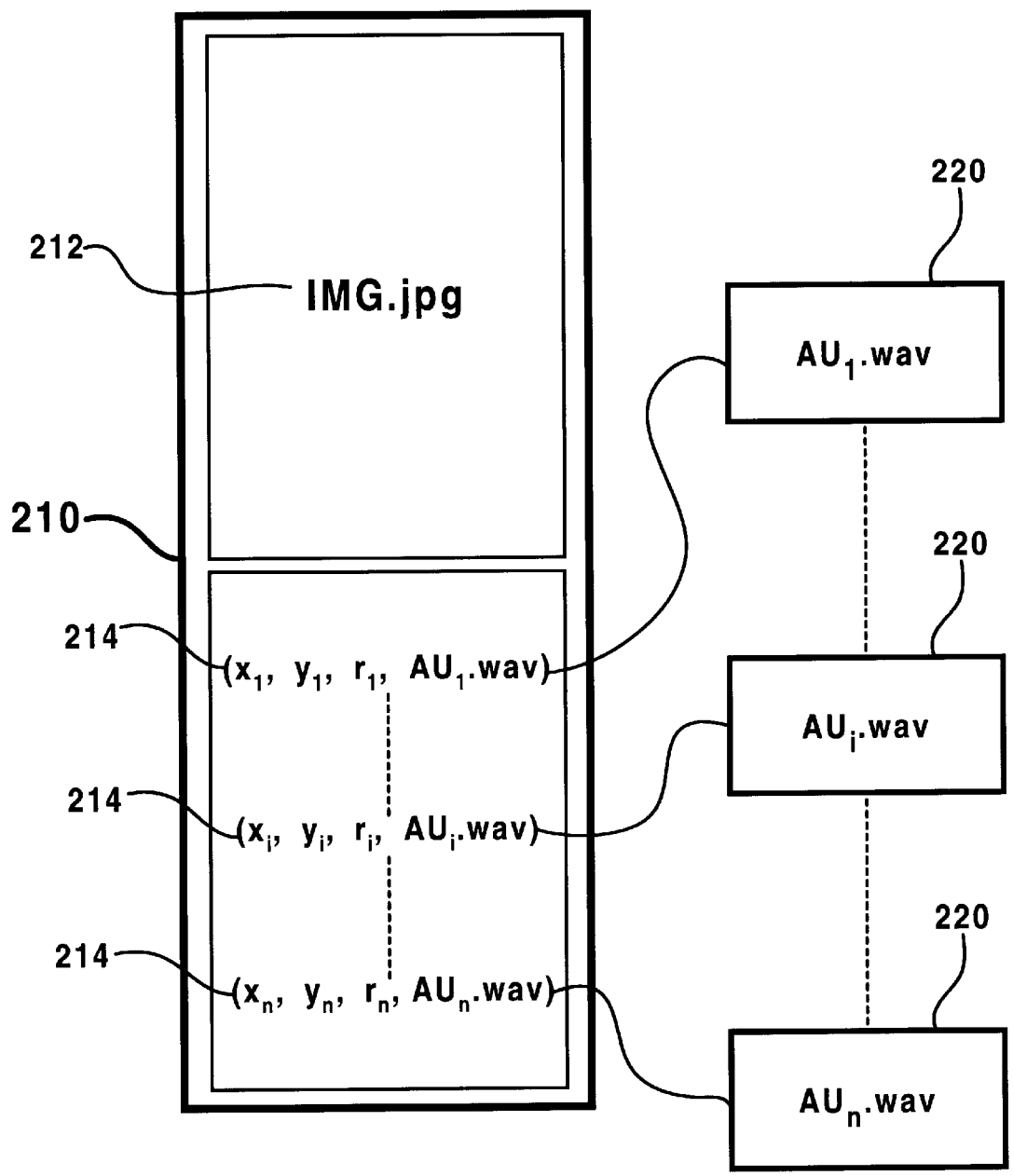
FIG. 5 is a diagram of a data structure for storing audio files with an image file according to the present invention.

In FIG. 5, a data structure for storing the image file 210 in the memory 120 is illustrated. The image file 210 includes image data 212 for a single image, and may include one or more audio file identifiers 214, for its associated audio file 220. The image data 212 can be in the JPEG format as indicated by the ".jpg" file extension on the image file name IMG.jpg. The audio file 220 is associated with the image file 210 by the audio file identifier 214. The audio file identifier 214 includes the audio file name $AU_i.wav$, the effective radius $r_i$, and the audio file attachment position $x_i, y_i$. In FIG. 5 there are three audio files included with the image file 210. Each audio file 220 has a corresponding audio file name $AU_i.wav$, effective radius $r_i$, and audio file attachment position $x_i, y_i$.

The amount of memory required to store the image file 210 will depend on the size of the image file 210. The size of the image file 210 depends on the resolution of the image sensor used to capture the image and/or on a user selected resolution for a particular type of image. For instance, in the case of a standard resolution image, the image sensor resolution is 768 pixels*512 pixels=393,216 pixels=393 kilo-pixels, for a medium resolution image the image sensor resolution is 1152 pixels*768 pixels=884,736 pixels=884 kilo-pixels, and for a high resolution image the sensor resolution is 1536 pixels*1024 pixels=1,572,864 pixels= 1573 kilo-pixels. Ultimately, the size of the image file 210 will depend on the number of bytes of data associated with each pixel. In order to conserve the amount of memory required to store the image file 210, the image data from the pixels is compressed before storing the image file 210 in memory. During capture of an image a compression ratio of 1:5 can be used to preserve image quality. Images captured at the standard resolution can be compressed to approximately 1:8. For a snapshot the image can be compressed to 1:14. In the case of a color image, a single pixel requires 24-bits of data to represent a portion of the image that is incident on that pixel. For instance, a color image captured at the medium resolution of 1152 pixels*768 pixels and compressed to 1:8 would result in the image file 210 having the following image size:

Image Size=(Resolution)*(Bits/Pixel)*(Compression Ratio)÷(8*1024)

Image Size=[(1152 pixels*768 pixels)*(24 bits)]÷(8*8*1024)

Image Size=324 kilo-bytes

In one embodiment of the present invention, the device 100 includes the image capturer 140 for capturing an image, memory 120 for storing the captured image in an image file 210 and for retrieving the image file 210. The image data in the retrieved image file 210 can be displayed on the monitor 160. The cursor control 24 is operative to move the cursor 44 to select at least one specific portion of the image displayed on the monitor 160 and for assigning an audio file attachment position to that specific portion. The audio file attachment position includes coordinate information about the specific portion. The coordinate information can be x-y coordinates as mentioned above.

The audio recorder 130 is operative to record audio information from either of the microphones 10 or 40 and to generate an audio file 220. Recording can be initiated by pressing the record button 34, and recording can be stopped by pressing the stop button 25. The audio file attachment position associates the audio file 220 with the specific portion of the image. The audio file 220 includes the audio file attachment position and the memory 120 stores the audio file 220 in the image file 210. More than one specific portion of the image can be selected using the cursor control 24. For each specific portion of the image selected there is a corresponding audio file attachment position that associates an audio file with the selected portion of the image. Therefore, the image file 210 can be associated with one or more audio files 220, each audio file having a corresponding audio file attachment position.

In another embodiment of the present invention, the device 100 includes audio playback through the speaker 150. To play back the audio files that are associated with various portions of the image, the image file 210 is retrieved by the memory 120 and displayed on the monitor 160. The cursor control 24 is used to move the cursor 44 to one of the previously selected specific portions of the image and the audio file 220 associated with that specific portion of the image by its audio file attachment position is retrieved from the memory 120 and played back on the speaker 150.

In one embodiment of the present invention, the image displayed on the monitor 160 includes a circle for each specific portion selected by the cursor control 24. Each circle has an effective radius $r_i$ that is centered about its corresponding audio file attachment position. The cursor control 24 is manipulated to position the cursor anywhere within the circle and the audio file 220 associated with that audio file attachment position is retrieved from the memory 120 and played back on the speaker 150. Calculation of the effective radius $r_i$ will be discussed below.

In another embodiment of the present invention, as illustrated in FIG. 5, the audio file 220 is associated with the image file 210 by an audio file identifier 214. The audio file identifier includes an audio file name for the audio file, the audio file attachment position, and the effective radius $r_i$. For example, if the audio file 220 is stored in the WAVE ".wav" format, then the audio file identifier 214 can be of the form $(x_i, y_i, r_i, AU_i.wav)$, where $AU_i.wav$ is the audio file name.

In one embodiment of the present invention, the device 100 includes the image capturer 140, the audio recorder 130, and the memory 120 for storing recorded audio information in an audio file 310 and for retrieving the audio file 310. The audio recorder 130 is operative to record audio information from either of the microphones 10 or 40 and to generate the audio file 310. Recording can be initiated by pressing the record button 34, and recording can be stopped by pressing the stop button 25. During the recording, one or more images can be captured by the image capturer 140. For each captured image one image file 320 is generated by the image capturer 140. Each captured image includes an image playback start time and an image playback end time that is associated with its image file 320. The image playback start time for an image can be selected by pressing the shutter button 12 and the image playback end time can be selected by pressing the timing button 22. The memory 120 stores each image file 320 and its associated image playback start time and image playback end time in the audio file 310. The image file 320 need not be stored in the audio file 310. For instance, the image file 320 can be a discrete file stored in the memory 120.

Alternatively, if the timing button 22 is not pressed for the current image and another image is captured by pressing the shutter button 12, then the image playback start time for the next image (generated by pressing the shutter button 12) becomes the image playback end time for the current image.

In another embodiment of the present invention, the device 100 includes audio playback through the speaker 150, the user interface 170, and the monitor 160 for displaying images during audio playback. The monitor 160 can display one or more audio files that have been previously recorded and the cursor control 24 can be used to manipulate the cursor 44 to select one of the audio files. The selected audio file 310 is played back on the speaker 150 and the image files associated with that audio file 310 are displayed on the monitor 160 in a sequence determined by their respective image playback start time and image playback end time.

In one embodiment of the present invention, each image file 320 is associated with the audio file 310 by an image file identifier 314. The image file identifier 314 includes an image file name, the image playback start time, and the image playback end time. The image file identifier 314 is stored in the audio file 310.

Figure 9:
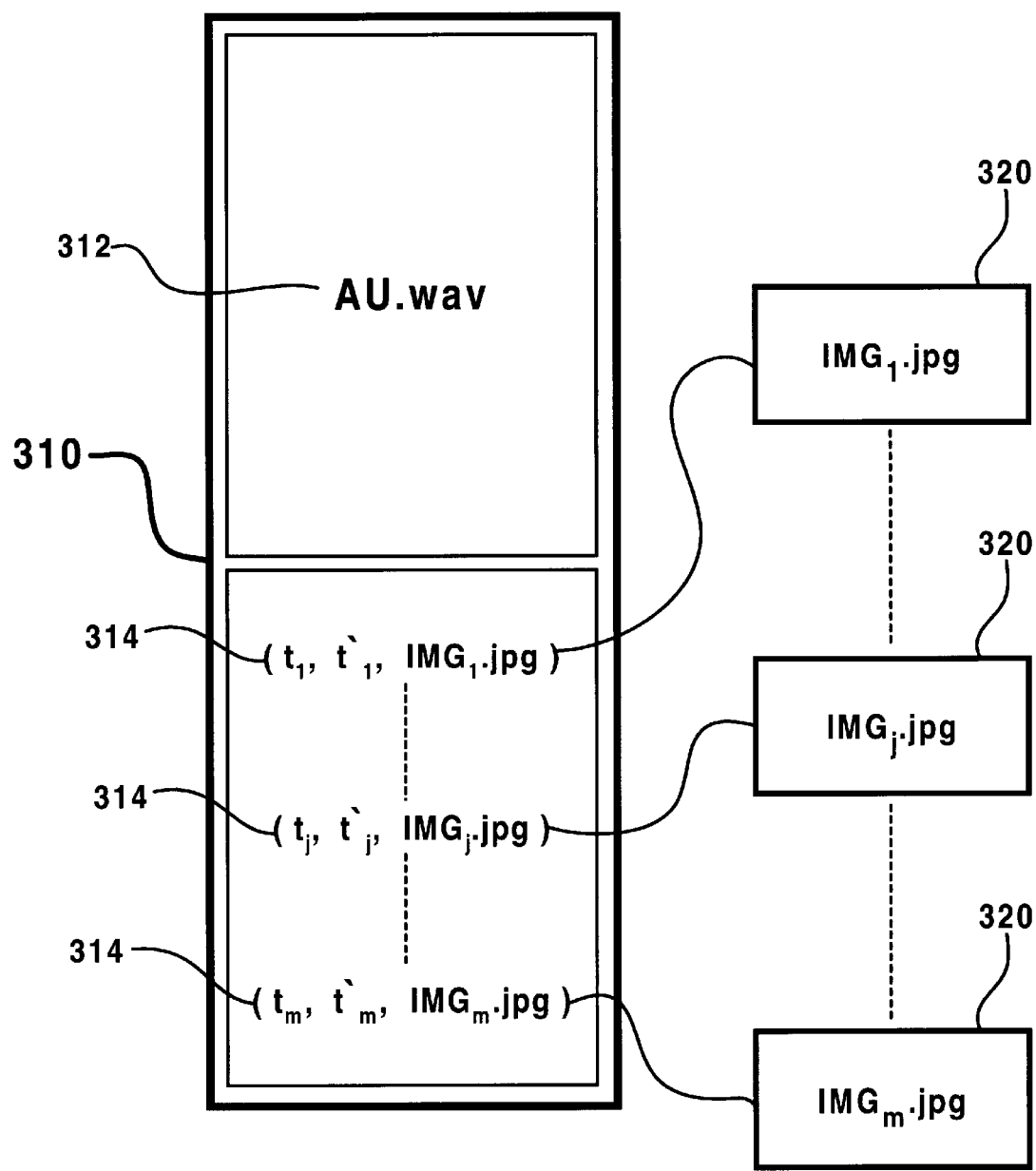
FIG. 9 is a diagram of a data structure for storing image files with an audio file according to the present invention.

In FIG. 9, a data structure for storing the audio file 310 in the memory 120 is illustrated. The audio file 310 includes audio information 312 for a single audio recording, and may include one or more image file identifiers 314, for its associated image files 320. As mentioned above the audio information 312 can be in the WAVE format as shown by the ".wav" file extension for the audio file name AU.wav. The image file 320 is associated with the audio file 310 by the image file identifier 314. The image file identifier 314 includes the image file name $IMG_i$.jpg, the image playback start time $t_i$, and the image playback end time $t'_i$. In FIG. 9 there are three image files associated with the audio file 310. Each image file 320 has a corresponding image file name $IMG_i$.jpg, image playback start time $t_i$, and image playback end time $t'_i$.

Figure 4:
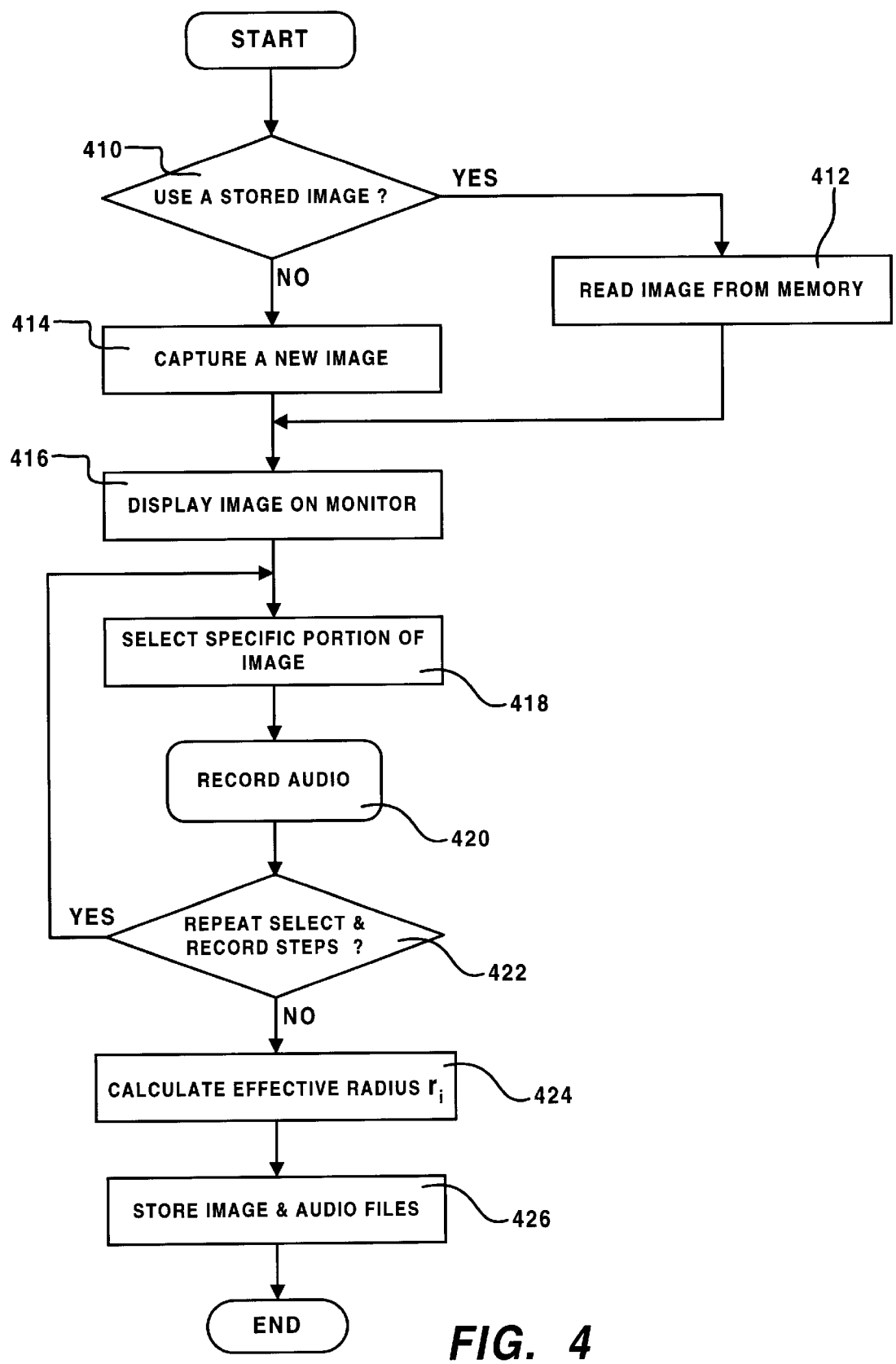
FIG. 4 is a diagram illustrating a method for attaching audio files to a single image file according to the present invention.

FIG. 4 is a diagram illustrating a method for associating one or more audio files with an image file according to the present invention. The user decides 410 whether to use an image file 210 that is already stored in the memory 120. The cursor control 24 can be used to make a selection from the menu 46 and the control button 36 is pressed to make the selection. If the user decides to use the stored image, the image file 210 is read 412 from the memory 120 and displayed 416 on the monitor 42.

On the other hand, if the user decides to capture a new image 414, then the shutter button 12 is pressed and the image capturer 140 captures the image and the image is displayed 416 on the monitor 42. The cursor control 24 is used to move the cursor 44 to a specific portion of the image 418 and the select button 14 is pressed to assign an audio file attachment position to the specific portion selected. The audio file attachment position includes coordinate information about the specific portions as mentioned above.

Next, the record button 34 is pressed to record audio information 420 using the audio recorder 130 to generate an audio file 220. The audio file 220 is associated to the image file 210 by the audio file attachment position. The user can decide to repeat the selection 418 and recording 420 steps to generate additional audio files and their respective audio file attachment positions. Finally, each audio file 220 and its attachment position are stored 426 in the image file 210 by the memory 120.

In another embodiment of the present invention, the method for associating one or more audio files with an image file includes calculating 424 an effective radius $r_i$ for each specific portion the user selected. The effective radius $r_i$ is centered about the audio file attachment position and the effective radius $r_i$ is calculated prior to the storing step 426.

In another embodiment of the present invention, the method for associating one or more audio files with an image file includes associating each audio file 220 with the image file 210 by using an audio file identifier 214. Each audio file 220 has a corresponding audio file identifier 214. The audio file identifier 214 includes an audio file name, the audio file attachment position, and the effective radius $r_i$. The audio file identifier 214 is stored in the image file 210 by the memory 120 as illustrated in FIG. 5.

In one embodiment of the present invention, the method for associating one or more audio files with an image file includes reading the image file 210 from a previously captured image from the memory 120 and then displaying the image on the monitor 42. The cursor control 24 is manipulated to move the cursor 44 to select a specific portion of the image. The audio file 220 associated to that specific portion of the image by its audio file attachment position is read from the memory 120 and then played back on the speaker 150.

In another embodiment, the image displayed on the monitor 42 includes a circle for the specific portion. The circle has the effective radius $r_i$ that is centered about the audio file attachment position. The cursor control 24 positions the cursor 44 anywhere within the circle so that the audio file 220 associated with that circle is retrieved from the memory 120 and played back on the speaker 150.

In one embodiment the audio file 220 is associated with the image file 210 by the audio file identifier 214. The audio file identifier 214 includes an audio file name, the audio file attachment position, and the effective radius $r_i$. The audio file identifier 214 is stored in the image file 210 by the memory 120 as illustrated in FIG. 5.

Figure 6:
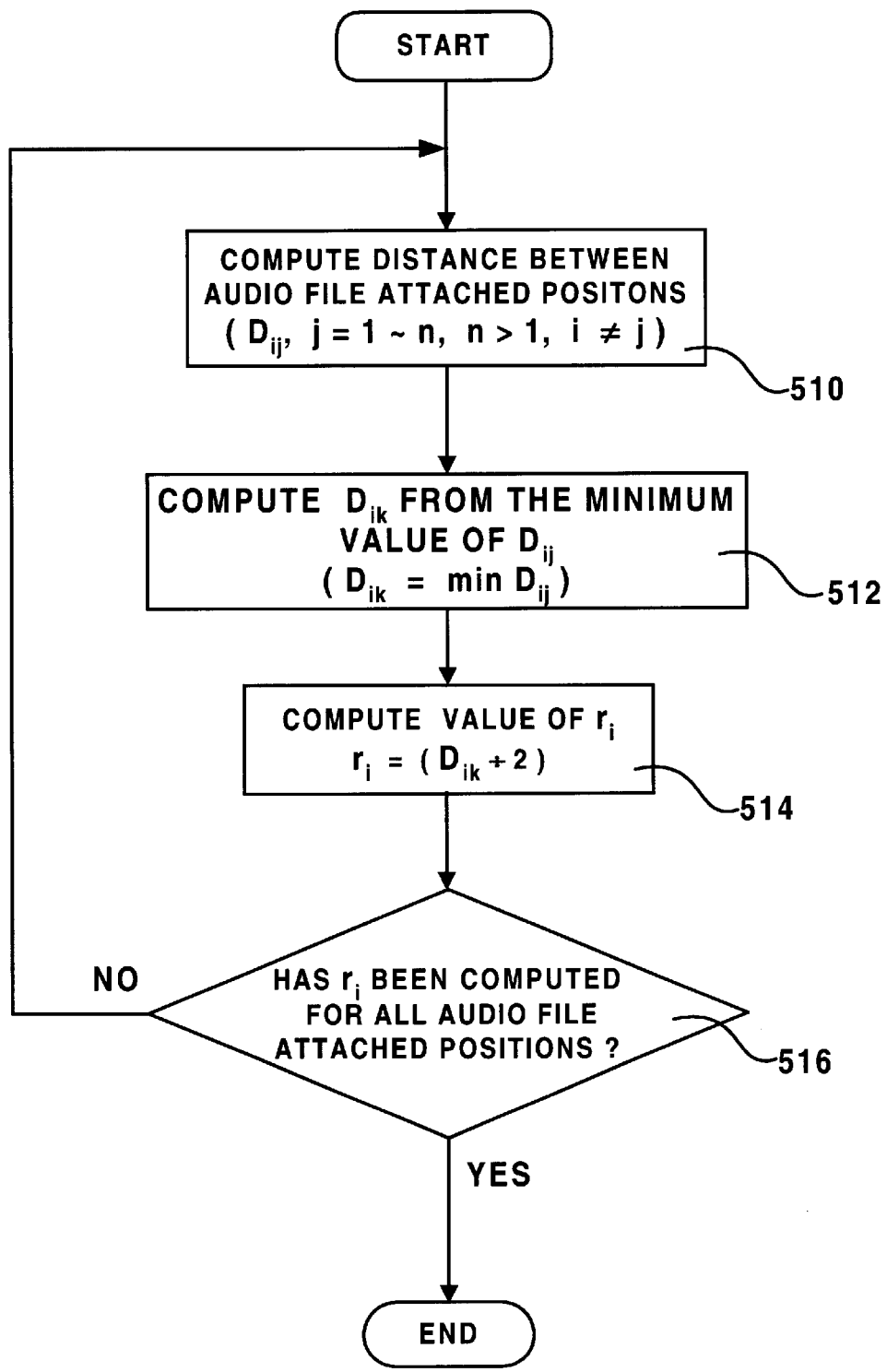
FIG. 6 is a diagram of a method for calculating the effective radius according to the present invention.

In FIG. 6, a diagram for calculating the effective radius $r_i$ for each audio file attachment position is illustrated. The diagram of FIG. 6 should be used in conjunction with FIG. 12 and FIG. 13 to understand how the effective radius $r_i$ is calculated for each audio file attachment position and how the circle centered about the effective radius $r_i$ is displayed on the monitor 42.

Figure 12:
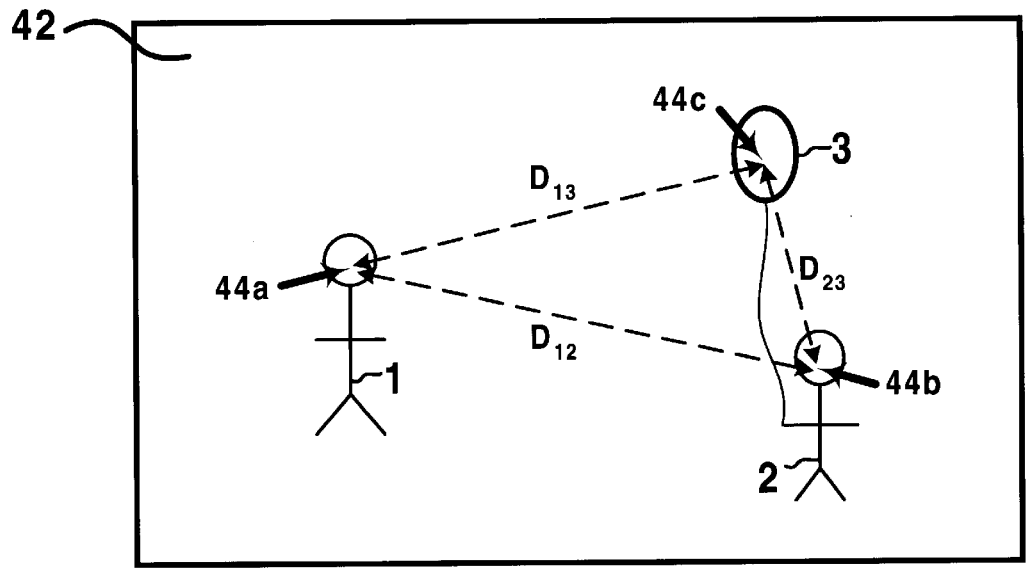
FIG. 12 is an illustration of how the effective radius is calculated according to the present invention.

In FIG. 12, the monitor 42 has three images 1, 2, and 3 displayed thereon. The user has manipulated the cursor control 24 to position the cursor 44 to select three specific positions on the monitor as shown by cursor positions 44a, 44b, and 44c that correspond to the images 1, 2, and 3 respectively. Those cursor positions are the audio file attachment positions for images 1, 2, and 3 respectively.

In FIG. 6, the effective radius $r_i$ is calculated by first computing 510 the distance $D_{ij}$ between each audio file attachment position. From FIG. 12, for image 1 the distance between images 1 and 2 is $D_{12}$. Similarly, the distance between images 1 and 3 is $D_{13}$. Accordingly, the distance between image 2 and images 1 and 3 are $D_{12}$ and $D_{23}$ respectively, and the distance between image 3 and images 1 and 2 are $D_{13}$ and $D_{23}$ respectively. Next the minimum distance $D_{ik}$ between neighboring audio file attachment positions is computed 512. For image 1 the minimum distance between images 2 and 3 is $D_{13}$ because the distance $D_{13}$ is less than the distance $D_{12}$. The effective radius $r_i$ is computed 514 by dividing the minimum distance $D_{ik}$ by two (2) such that $(r_i=D_{ik}\div 2)$. Finally, the effective radius $r_i$ for all remaining audio file attachment positions is computed by repeating 516 the distance computing step 510, the minimum distance computation step 512, and the effective radius computation step 514. As shown in FIG. 12, images 2 and 3 have the same effective radius $r_i$ because the distance $D_{23}$ is less than $D_{13}$ or $D_{12}$.

Figure 13:
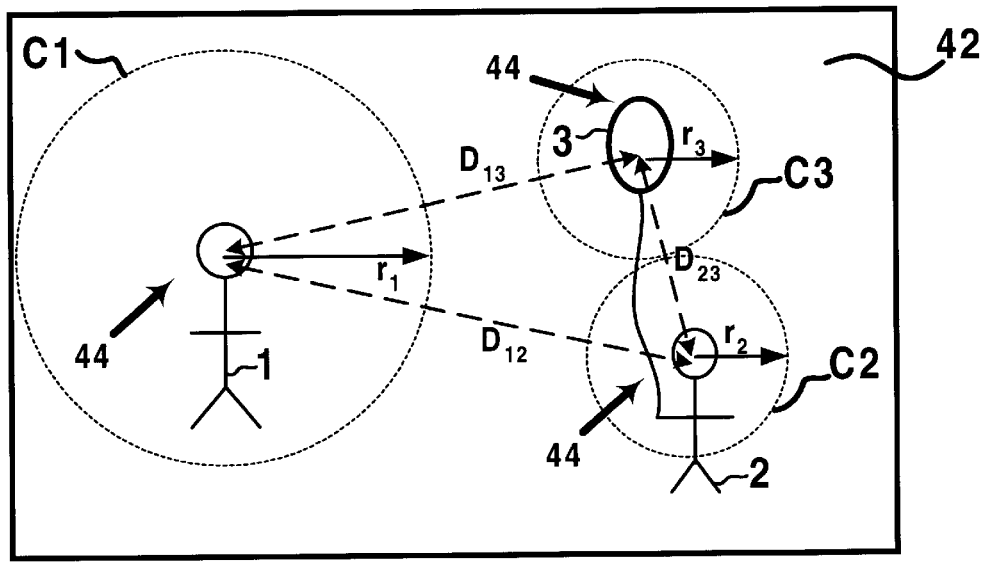
FIG. 13 is an illustration of a circle centered about an audio file attachment position according to the present invention.

In FIG. 13, each of the images 1, 2, and 3 has an associated effective radius of $r_1$, $r_2$, and $r_3$ respectively. When the image file 210 that includes the images 1, 2, and 3 is retrieved from the memory 120 and displayed on the monitor 42, each image will be displayed with a circle as illustrated in FIG. 13. The circles C1, C2, and C3 correspond with the images 1, 2, and 3 respectively. The image file 210 has three audio files 220 that are associated to the image file 210 by the audio file identifier 214. In this example there would be three audio file identifiers. The audio file identifier 214 includes the effective radius of $r_1$, $r_2$, and $r_3$ for the audio files that are attached to the images 1, 2, and 3.

The cursor control 24 can be used to move the cursor 44 anywhere within the circles C1, C2, and C3 to retrieve the audio file 220 that is attached to that circle as illustrated in FIG. 13. For instance, to playback the audio file 220 that is attached to image 1, the cursor 44 is moved so that it is either on or within the circle C1. The play button 32 is then pressed to start playback of the audio file 220. The process can be repeated for the other circles C2 and C3.

Figure 7:
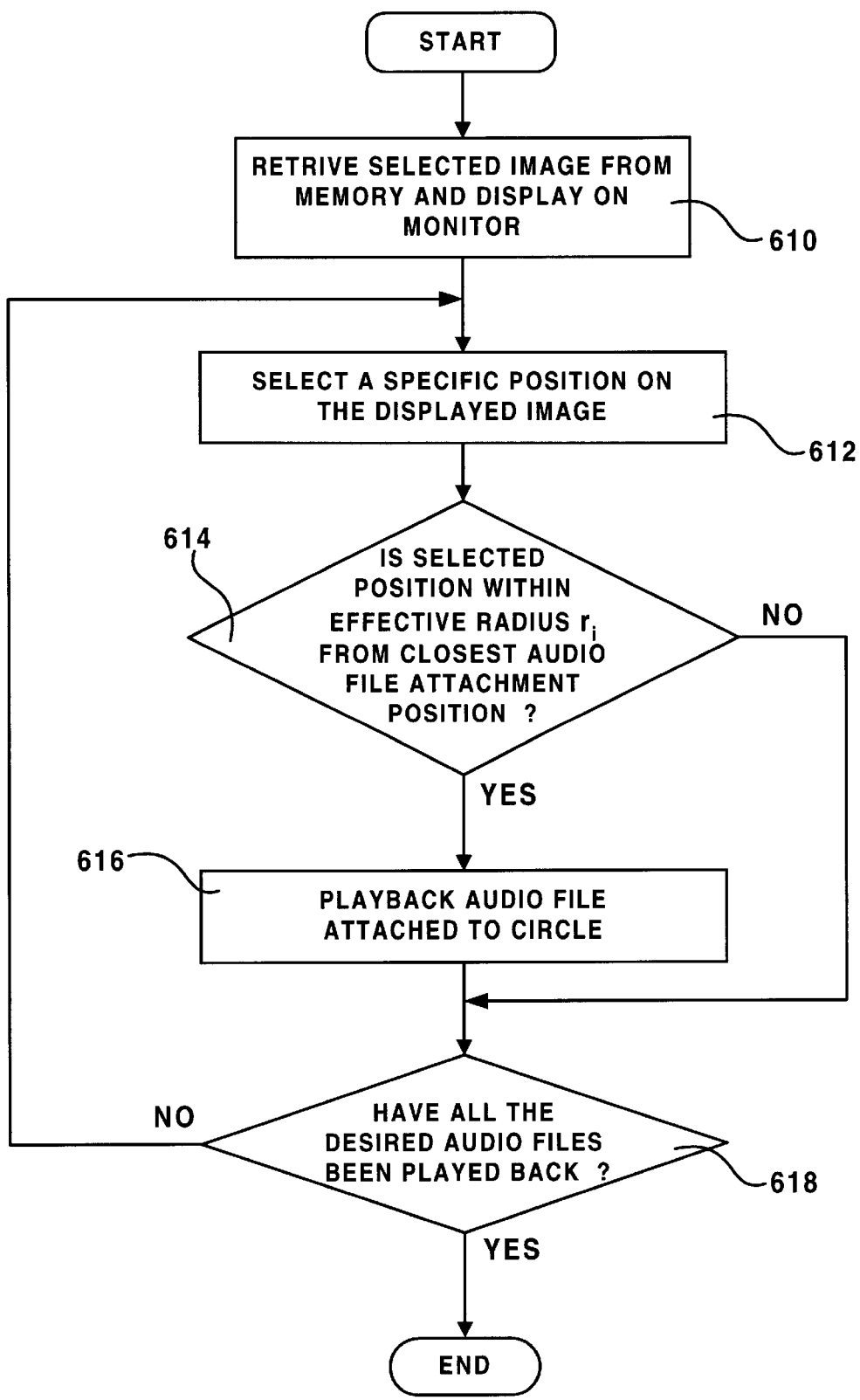
FIG. 7 is a diagram of a method for audio playback according to the present invention.

FIG. 7 is a diagram illustrating playback of an image having one or more attached audio files. The image file 210 to be displayed on the monitor 42 is retrieved 610 from the memory 120. The cursor control 24 is used to select 612 one position on the monitor 42. The position of the cursor 44 is compared to the position of the audio file attachment and the circle created by the effective radius $r_i$ to determine 614 if the cursor 44 is on or within the circle. If the cursor is within the circle, the play button 32 can be pressed to playback the audio file 220 attached to that circle. The process can be repeated 618 for additional audio files that are attached to other circles displayed on the monitor 42.

Figure 8:
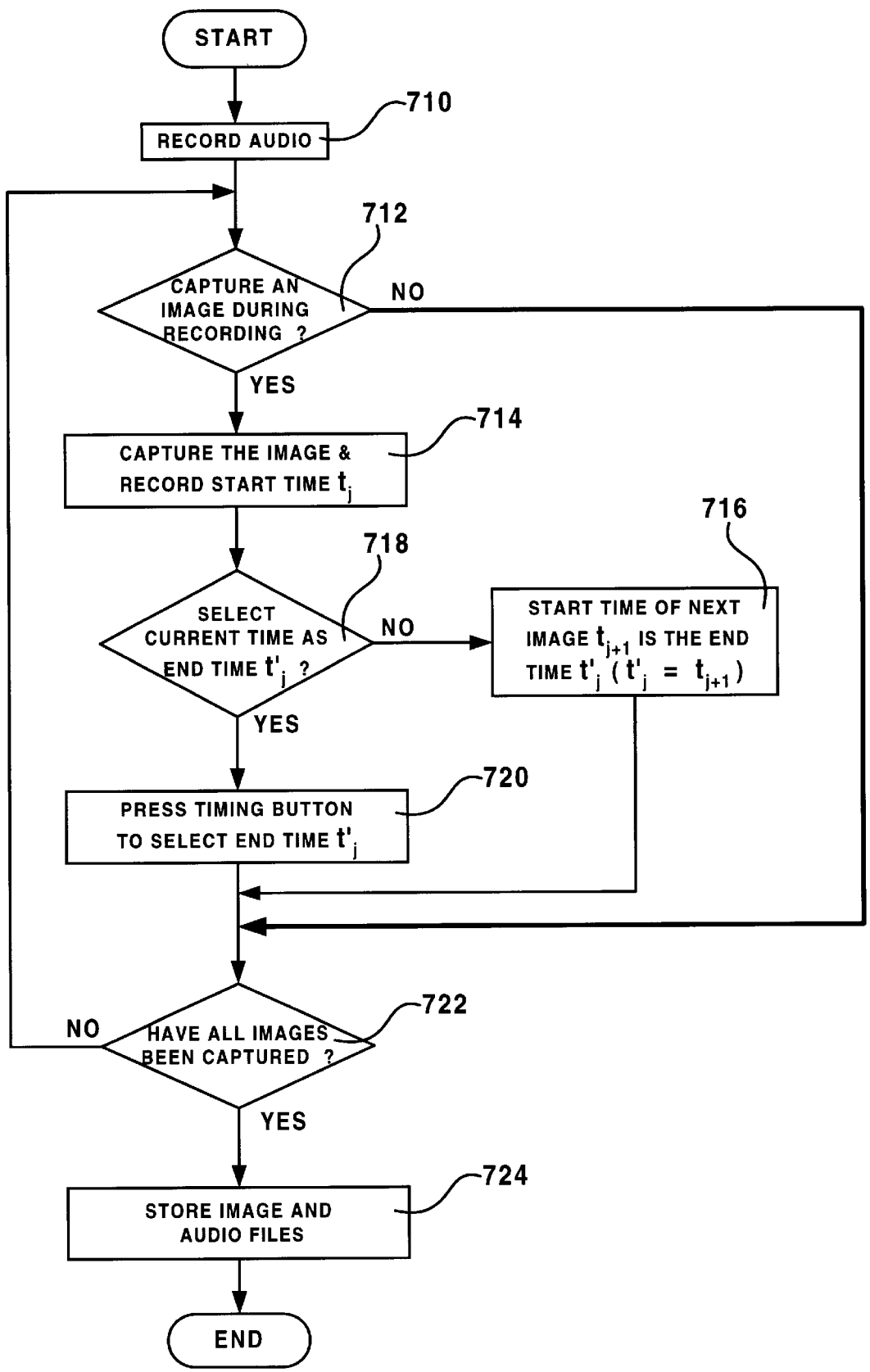
FIG. 8 is a diagram of a method for recording audio and capturing images according to the present invention.

FIG. 8 is a diagram illustrating a method for associating one or more image files with an audio file according to the present invention. The user decides to record audio information 710 to generate an audio file 310. An image is captured 712 to generate an image file 320. An image playback start time $t_j$ for the image file 320 is captured 714 by pressing the shutter button 12. The current time can be selected 718 as the image playback end time $t'_j$ by pressing 720 the timing button 22. Alternatively, the capturing of a new image 716 by pressing the shutter button 12 selects the image playback end time $t'_j$ as the time at which the shutter button 12 was pressed for the new image ($t'_j=t_{j+1}$). The above process can be repeated 722 until all desired images have been captured. Finally, all the image files generated during the recording of the audio file 310 are stored 724 in the audio file 310 by the memory 120. The image playback start time $t_j$ and the image playback end time $t'_j$ are associated with their corresponding image file 320 so that during audio playback of the audio file 310, the image files are displayed on the monitor 42 in the order in which they were originally captured.

In another embodiment of the present invention, each image file 320 is associated to the audio file 310 by an image file identifier 314. The image file identifier 314 includes an image file name, the image playback start time $t_j$, and the image playback end time $t'_j$. The image file identifier 314 is stored in the audio file 310 by the memory 120. FIG. 9 illustrates a data structure for storing the audio file 310 in the memory 120. The audio file 310 includes three JPEG image files 320 and their corresponding image file identifiers 314.

Figure 10:
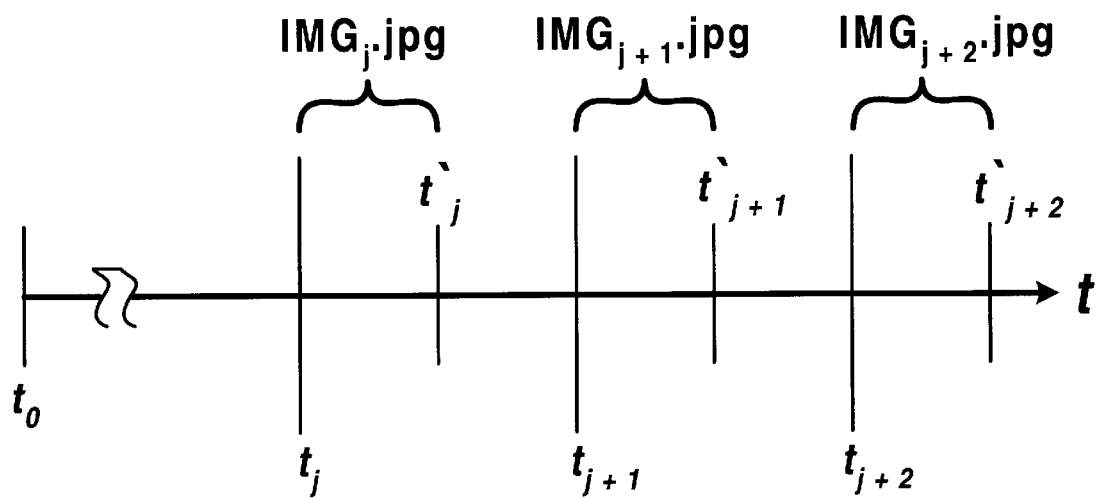
FIG. 10 is a diagram illustrating image playback start and end times according to the present invention.

FIG. 10 illustrates the method of FIG. 8 in which the shutter button 12 is used to generate the image playback start time $t_j$ and the timing button 22 is used to generate the image playback end time $t'_j$. The recording of audio information 710 begins at time $t_0$ and continues thru time $t$. Three images are captured 714 to generate three image files $IMG_j$.jpg, $IMG_{j+1}$.jpg, and $IMG_{j+2}$.jpg. The shutter button 12 is used to generate image playback start times of $t_j$, $t_{j+1}$, and $t_{j+2}$ for the three images respectively. The timing button 22 is used to generate 718 image playback end times of $t'_j$, $t'_{j+1}$, and $t'_{j+2}$ for the three images respectively. If the timing button 22 was not used, then the image playback end times would be generated 716 by pressing the shutter button 12 for a new image and the image playback end times would be $t_{j+1}$, $t_{j+2}$, and $t$.

Figure 11:
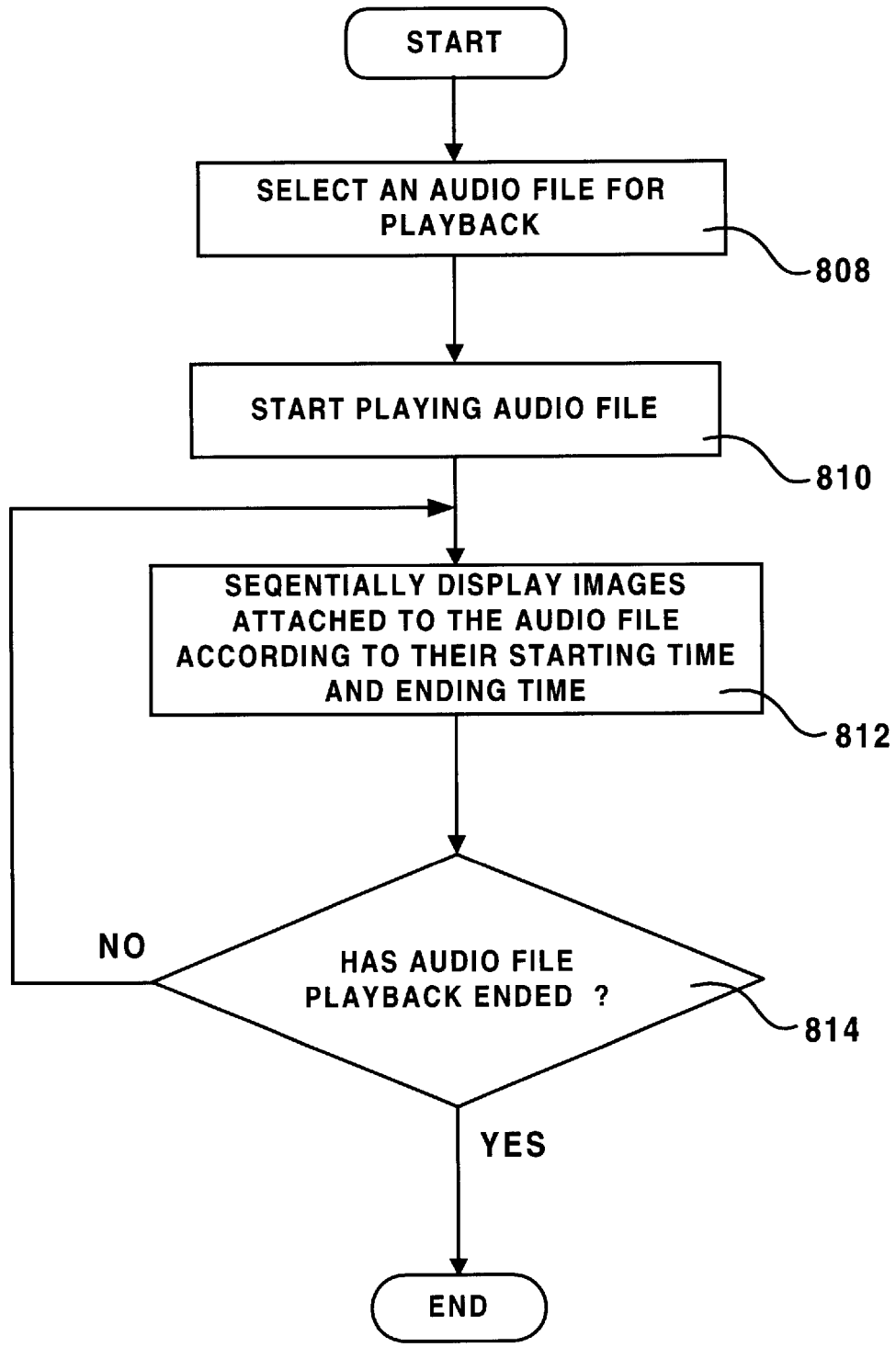
FIG. 11 is a diagram illustrating audio playback with sequential playback of images according to the present invention.

In one embodiment of the present invention as illustrated in FIG. 11, the method for associating one or more image files with an audio file includes selecting 808 an audio file for playback on the speaker 150 by using the cursor control 24 to select an audio file name displayed on the monitor 160 and playing 810 the audio file 310 by pressing the play button 32. Image files 320 associated with the audio file 310 are sequentially displayed 812 on the monitor 160 according to their image playback start times and their image playback end times. The display of the images continues 814 until playback of the audio file 310 ends.

In another embodiment of the present invention, each image file 320 is associated to the audio file 310 by an image file identifier 314. The image file identifier 314 includes an image file name, the image playback start time $t_j$, and the image playback end time $t'_j$. The image file identifier 314 is stored in the audio file 310 by the memory 120. FIG. 9 illustrates a data structure for storing the audio file 310 in the memory 120.

Although several embodiments of the present invention have been disclosed and illustrated, the invention is not limited to the specific forms or arrangements of parts so described and illustrated. The invention is only limited by the claims.

What is claimed is:

1. A device comprising:
   memory means for storing and retrieving an image file and an audio file;
   a monitor for displaying an image stored in the image file;
   cursor control means for selecting one or more specific portions of the image retrieved form the image file and displayed on the monitor and for assigning an audio file attachment position to each specific portion selected by the cursor control means, and each audio file attachment position includes coordinate information about the specific portion to which it is assigned; and audio recording means for recording audio information and for generating the audio file from the audio information, wherein a user manipulates the cursor control means to select the one or more specific portions of the image and audio information corresponding to each specific portion selected is recorded by the audio recording means to generate an audio file for each specific portion, the image file includes the audio file attachment position of each audio file so that each audio file is associated with the specific portion selected by the user, and each audio file is stored by the memory means.

2. The device of claim 1 and further comprising audio playback means for audio playback of the audio information stored in the audio file, wherein the monitor displays the image stored in the image file and the user manipulates the cursor control means to select the specific portion of the image and the audio file associated with the specific portion is retrieved by the memory means and is played back on the audio playback means.

3. The device of claim 2, wherein the image displayed on the monitor includes a circle for the specific portion selected by the user, the circle for the specific portion has an effective radius that is centered about the audio file attachment position, the user manipulates the cursor control means to select a position anywhere within the circle, and the audio file associated with the specific portion is retrieved by the memory means and is played back on the audio playback means.

4. The device of claim 3, wherein the audio file is associated with the image file by an audio file identifier, the audio file identifier is stored in the image file, and the audio file identifier includes an audio file name for the audio file, the audio file attachment position, and the effective radius.

5. A device comprising:

image capturing means for capturing an image and for generating an image file from the image;

a monitor for displaying the image;

audio recording means for recording audio information and for generating an audio file from the recorded audio information, memory means for storing and retrieving the image file and the audio file; and cursor control means for selecting one or more specific portions of the image retrieved form the image file and displayed on the monitor and for assigning an audio file attachment position to each specific portion selected by the cursor control means, and each audio file attachment position includes coordinate information about the specific portion to which it is assigned; and wherein a user manipulates the cursor control means to select the one or more specific portions of the image and audio information corresponding to each specific portion selected is recorded by the audio recording means to generate an audio file for each specific portion, the image file includes the audio file attachment position of each audio file so that each audio file is associated with the specific portion selected by the user, and each audio file is stored by the memory means.

6. The device of claim 5 and further comprising audio playback means for audio playback of the audio information stored in the audio file, wherein the monitor displays the image stored in the image file and the user manipulates the cursor control means to select the specific portion of the image and the audio file associated with the specific portion is retrieved by the memory means and is played back on the audio playback means.

7. The device of claim 6, wherein the image displayed on the monitor includes a circle for the specific portion selected by the user, the circle for the specific portion has an effective radius that is centered about the audio file attachment position, the user manipulates the cursor control means to select a position anywhere within the circle, and the audio file associated with the specific portion is retrieved by the memory means and is played back on the audio playback means.

8. The device of claim 7, wherein the audio file is associated with the image file by an audio file identifier, the audio file identifier is stored in the image file, and the audio file identifier includes an audio file name for the audio file, the audio file attachment position, and the effective radius.

9. A device comprising:

image capturing means for capturing an image and for generating an image file from the image;

audio recording means for recording audio information and for generating an audio file from the recorded audio information and the recording of the audio information is initiated by pressing a record button and is stopped by pressing a stop button; and memory means for storing the audio file and for storing the image file, wherein during audio recording the recording means generates the audio file and one or more images that are captured using the image capturing means to generate a single image file for each image captured, and the image file for each captured image has an image playback start time and an image playback end time associated therewith, the image playback start time is selected by pressing a shutter button and the image playback end time is selected by pressing a selected one of a timing button or the shutter button, and the memory means stores the audio file, the image file, the image playback start time, and the image playback end time.

10. The device of claim 9 and further comprising:

audio playback means for audio playback of the audio information stored in the audio file; and a monitor for displaying the image file, and wherein the audio file is played back by the audio playback and each image file is retrieved by the memory means and is displayed on the monitor in a sequence determined by its associated image playback start time and image playback end time.

11. The device of claim 10, wherein each image file is associated with the audio file by an image file identifier, the image file identifier is stored in the audio file, and the image file identifier includes an image file name, the image playback start time, and the image playback end time.

12. A method for associating an audio file with an image file comprising:

(a) providing an image;

(b) displaying the image on a monitor;

(c) selecting one or more specific portions of the image using a cursor control means, wherein an audio file attachment position is assigned to each specific portion selected, the audio file attachment position includes coordinate information about the specific portion to which it is assigned;

(d) generating an audio file by recording audio information corresponding to the specific portion using an audio recording means, the image file includes the audio file attachment position so that the audio file is associated with the specific portion of the image;

(e) repeating the selecting and the generating steps to generate additional audio files that are associated with additional specific portions of the image; and (f) storing the audio files that have been generated using a memory means.

13. The method of claim 12 wherein the providing step includes reading the image to be displayed on the monitor from a previously stored image file using the memory means.

14. The method of claim 12 wherein the providing step includes capturing the image to be displayed on the monitor using an image capturing means.

15. The method of claim 12 and further comprising the step of:

calculating an effective radius for the audio file attachment position, the effective radius is centered about the audio file attachment position, and the effective radius is calculated prior to the storing step.

16. The method of claim 15 wherein each audio file has a corresponding audio file identifier that associates that audio file to the image file, the audio file identifier is stored in the image file, and the audio file identifier includes an audio file name, the audio file attachment position, and the effective radius.

17. A method for associating an audio file with an image file comprising:

(a) reading an image from an image file using a memory means;

(b) displaying the image on a monitor;

(c) selecting a specific portion of the image using a cursor control means;

(d) reading an audio file associated with the specific portion using the memory means, the audio file includes an audio file attachment position including coordinate information about the specific position selected by the cursor control means; and (e) playing back audio information contained in the audio file using an audio playback means.

18. The method of claim 17 wherein the image displayed on the monitor includes a circle for the specific portion, the circle for the specific portion has an effective radius that is centered about the audio file attachment position, and the cursor control means selects a position anywhere within the circle so that the audio file associated with the specific portion is retrieved by the memory means and is played back on the audio playback means.

19. The method of claim 18 wherein each audio file is associated with the image file by an audio file identifier, the audio file identifier is stored in the image file, and the audio file identifier includes an audio file name for each audio file, the audio file attachment position, and the effective radius.

20. A method for associating an image file with an audio file comprising:

(a) capturing at least one image using an image capturing means, the image capturing means is operative to generate an image file for each image captured;

(b) generating an audio file by pressing a record button to initiate recording of audio information using an audio recording means and storing the audio file using a memory means;

(c) associating an image playback start time with each captured image by pressing a shutter button and associating an image playback end time with each captured image by pressing a selected one of a timing button or the shutter button; and (d) storing each captured image and its associated image playback start time and image playback end time using the memory means.

21. The method of claim 20, wherein each image file is associated with the audio file by an image file identifier, the image file identifier is stored in the audio file, and the image file identifier includes an image file name, the image playback start time, and the image playback end time.

22. The method of claim 20 an further comprising:

(a) playing back the audio information stored by the memory means using an audio playback means; and (b) sequentially displaying each image file on a monitor with the sequence of playback determined by the image playback start time and the image playback end time associated with each image file.

* * * * *